United States Patent
Dalrymple et al.

(12) United States Patent (10) Patent No.: US 6,256,389 B1
(45) Date of Patent: Jul. 3, 2001

(54) INTEGRATED TELECOMMUNICATION COLLABORATION SYSTEM

(75) Inventors: William Clyde Prentice Dalrymple; James Lashlee Matlock, both of Cary, NC (US); Patrick Michael O'Shaughnessey, New York, NY (US); Ta-Ming Chen; Robert Donald Monroe, Jr., both of Cary, NC (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/065,124

(22) Filed: Apr. 23, 1998

(51) Int. Cl.[7] .......................... H04L 12/00; H04M 3/56; H04N 7/15
(52) U.S. Cl. .......................... 379/900; 348/15; 370/260; 370/270; 370/353; 379/202; 709/204
(58) Field of Search .................. 348/15, 16; 370/260, 370/270, 352, 353, 354; 379/202, 265, 309, 900; 709/204, 241

(56) References Cited

U.S. PATENT DOCUMENTS 5,689,641 * 11/1997 Ludwig et al. ..................... 709/241
5,907,547 * 5/1999 Foladare et al. ................. 379/309 X

FOREIGN PATENT DOCUMENTS

0583094 A2   2/1994  (EP) .
0921659 A1   6/1999  (EP) .
2282506      4/1995  (GB) .

OTHER PUBLICATIONS

Patent Abstracts of Japan, vol. 14, No. 145, Mar. 19, 1990, JP 02 007752 A (Victor Co. of Japan, Ltd), Jan. 11, 1990 Abstract.
K.J. Loh et al., "Experience with Implementation of Multi-Party Video-Conferencing Application over Packet Networks", IEEE Globecom 1996/Global Internet '96 Conference Record, Nov. 18–22, 1996, pp. 53–57.

* cited by examiner

Primary Examiner—Harry S. Hong
(74) Attorney, Agent, or Firm—Withrow & Terranova, P.L.L.C.

(57) ABSTRACT

An integrated telecommunication collaboration system which allows the close integration of desktop computer applications, data communications, and public switched telephone network voice connections. Client software which implements the invention includes a voice agent for establishing telephone sessions, a data agent for establishing associated data sessions, a communications agent which synchronizes the date and voice agents, and an integration agent which integrates the data and voice communications with a computer operating system, and with various applications. The integrated telecommunication collaboration system controls the establishment of harmonized calls by sending and receiving various requests and status messages to and from a server, and another client.

29 Claims, 8 Drawing Sheets

INTEGRATED TELECOMMUNICATION COLLABORATION SYSTEM

BACKGROUND

1. Field of the Invention

This invention is related to the field of integrated desktop telecommunications. In particular, this invention relates to a way in which applications, data communications, and public switched telephone network (PSTN) voice calls can all be integrated together in a desktop computer system.

2. Description of the Problem Solved

Presently, voice telecommunications and data telecommunications are largely separate to most computer users. A desktop computer user can run an application which includes integrated multimedia communications, however, if the user wishes to initiate a voice communication, the user must use a separate PSTN telephone line. Alternatively, the user can make use of a data communications system which includes voice capability, where the voice communications path is terminated by the user's personal computer. Such a system however, makes use of some type of voice-data conversion, such as voice-over-lnternet-protocol, resulting in lower quality voice communications than is typical of the PSTN. Additionally, typical multimedia telecommunication applications do not allow for close integration with other desktop applications such as office suites, presentation software, word processing software and the like.

A typical multimedia telecommunications platform is specified in H.323, a well-known standard of the International Telecommunications Union (ITU). Application programs such as Microsoft Netmeeting™ allow the integration of voice communications together with multimedia telecommunications, however, the quality of the voice connection is poor. A high-quality voice connection can be made through the PSTN, however, this connection must usually be manually initiated. Additionally such a connection does not allow for close integration of the voice communications with the multimedia data communications. Products such as Voice Button®, marketed by the assignee of the present application, allow a PSTN call to be initiated from the computer user interface, however the call is not closely integrated with any sort of data communications system and does not allow application sharing. Additionally, such a call cannot be initiated from within desktop computer application suites. A description of a way a phone call can be initiated from the computer desktop can be found in U.S. patent application Ser. No. 08/948,975, entitled, "Method and Apparatus for Originating Voice Calls from a Data Network," Filed Oct. 10, 1997, which is assigned to the assignee of the present application and incorporated herein by reference.

What is needed is a way to provide integration between data and high-quality PSTN voice. Such a system should not only result in automated PSTN voice call origination through the public network, but also provide for the integration of voice and data communication components into common desktop computer application suites. The system should allow users to initiate a call having both voice and data components from within typical desktop applications and from within a generic operating system user interface. The system should also not require any specialized customer premises equipment (CPE).

SUMMARY

The present invention solves the above problems by providing a framework for the continuous delivery of value added communication services. The present invention enhances overall human communication efficiency by extending public switched telephone network (PSTN) voice calls with data and application sharing capabilities. The present invention consists of client software which integrates seamlessly with a personal, desktop computer operating system and desktop computer applications. The software controls communications through the PSTN, and through the public data network, and with any necessary servers within either of the networks. We call the invention an Integrated Telecommunications Collaboration System or an "ITCS". We further refer to a call initiated and maintained by such a system as a "harmonized" call, because the voice session, the data session, and one or more desktop applications are working in harmony. With the present invention, a user need only initiate one harmonized call which results in a PSTN voice session originating through the PSTN, and an associated data session established over a public data network connection.

The present invention can request a server such as a computer telephony server to establish a telephone connection with the calling user. In effect, the user's computer rings the user's telephone. Upon receiving a notification that the connection is established, the client software of the present invention requests the server to offer a harmonized call to a called user. When the client receives a notification that the harmonized call has been accepted by the called user, the client establishes the telephone session and associated data session with the called user. In an alternative embodiment the calling user initiates the harmonized call by picking up the telephone receiver. This results in an off-hook notification to the client software, allowing the client software to initiate a harmonized call. Optionally, the client software can notify the user of the progress of connecting the call. When the call is complete, the client receives a release notification message, and releases the telephone connection and the associated data connection.

The client software of the integrated telecommunication collaboration system can manage calls either with another integrated telecommunication collaboration system or with other types of data communication clients, which support the same data communications standards as used by the ITCS. When an integrated telecommunication collaboration system according to the present invention receives a call offered notification message, it requests the server to establish a telephone connection with the called user. Again, the client software rings the user's telephone. After receiving a notification that the telephone connection with the called user has been established, the client software participates in establishing a telephone session and the associated data session.

The integrated telecommunication collaboration system client according to the present invention includes a voice agent for establishing telephone connections through server, and the data agent for establishing associated data connections with other clients. A communications agent connected to both the voice agent and the data agent observes the voice agent and the data agent, synchronizes the communications of the voice agent in the data agent, and provides interfaces for plurality of service agents. An integration agent is connected to the communications agent and processes user input, makes requests, and provides interfaces to applications.

The software which implements many aspects of the present invention can be stored on a media. The media can be magnetic such as diskette, tape or fixed disk, or optical such as a CD-ROM. Additionally, the software can be supplied via the Internet or some type of private data network. A workstation which typically runs the client software includes a plurality of input/output devices a connection for a network and a system unit which includes both hardware and software necessary to run the Integrated Telecommunications Collaboration System client. A client workstation according to the present invention typically operates in a network which includes a PSTN, a public data network which has a service provider point of presence for providing the public data network connection, and a computer telephony server which is connected to both the PSTN in the public data network. The user's telephone is connected to the PSTN and the Integrated Telecommunication Collaboration System is connected to both the PSTN and public data network.

DETAILED DESCRIPTION OF THE PREFERRED EMBODIMENT

To illustrate how the invention operates, we will first describe the high-level call flows between the various components in a network where the invention is in use. As previously stated, we call our invention an Integrated Telecommunication Collaboration System, for which we will use the acronym "ITCS" for the sake of brevity. Throughout the following discussion, we refer to the calling user as "User1" and we refer to the called user as "User2". When we refer to an ITCS client, we are referring to client software running in a user's personal computer or workstation. When we refer to a desktop computer, we are referring to a computer which can sit on a desktop such as a personal computer. Although, such a system can sit on a desktop, it can also be a mobile or laptop computer, and such terminology is not meant to limit the environment of the invention. When we refer to a computer desktop, we are referring to the "desktop" interface of a graphical user interface based operating system.

A data communications platform forms a part of the invention. A platform with multimedia capabilities provides the most functionality to the user. In the preferred embodiment, the ITU H.323 platform is used and therefore H.323 is referred to in this discussion by way of example. As described below, it is possible for an ITCS to initiate harmonized calls to a non-ITCS client. As an example, we use a generic H.323 compliant client, that is an H.323 client without ITCS implemented. When we refer to a User2 H.323 client, we mean a generic client without ITCS implemented.

ITCS User to ITCS User Call Flows

Figure 1:
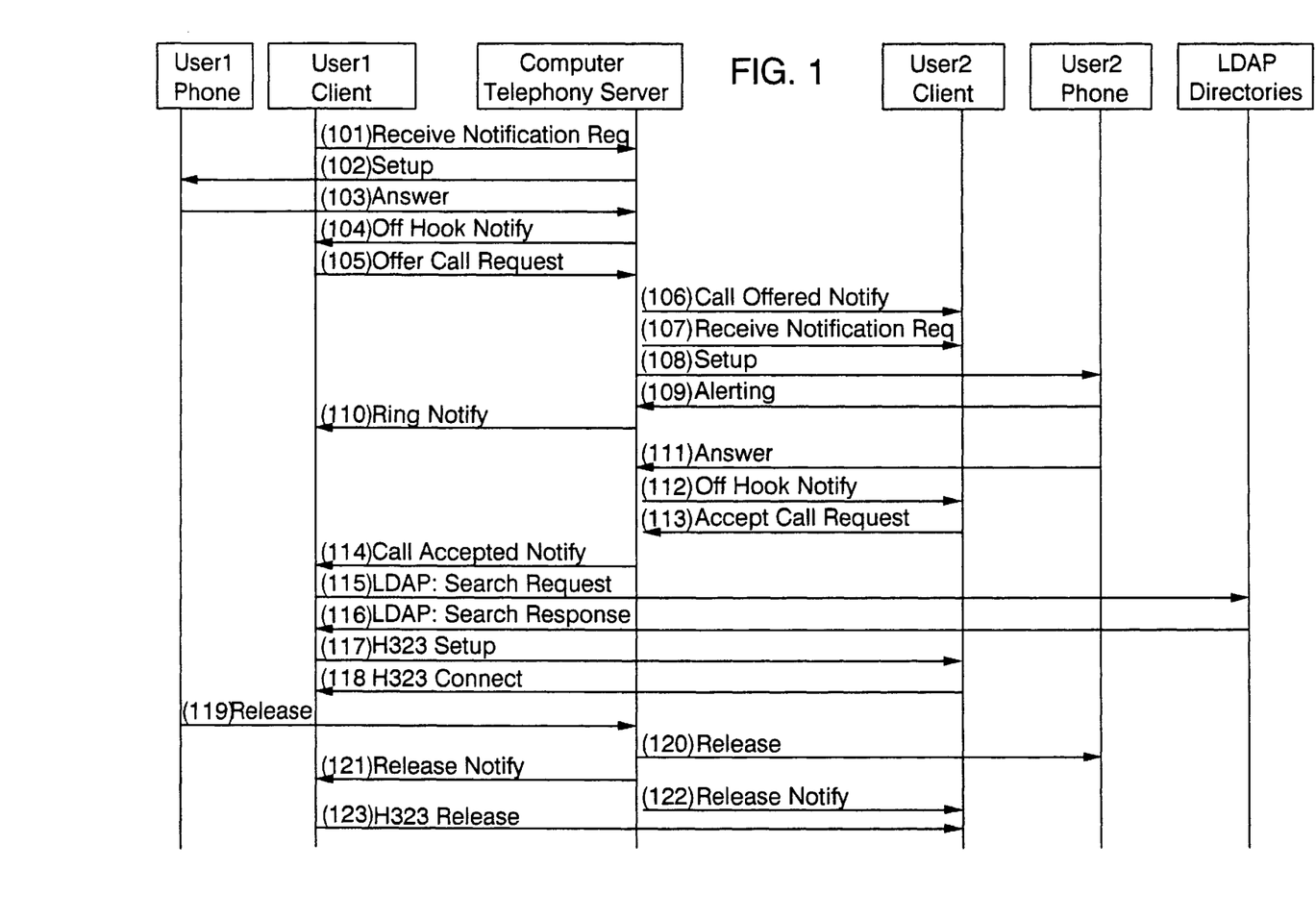
FIG. 1 is a call flow diagram which illustrates how a harmonized call is initiated to a called user who is using the Integrated Telecommunication Collaboration System of the present invention.

FIG. 1 describes the sequence of messages sent between the two user's clients and telephones and the computer telephony server ("CTServer") during the establishment and setup of a harmonized call between two ITCS users. The CTServer may be a "stand-alone" CTServer, a TAPI enabled phone device which supports similar requests and notifications, or a PSTN switch with built-in CTServer capability. It is also possible to provide the function through the advanced intelligent network (AIN), which is well-known. First, User1 notifies its client that the user wishes to originate a harmonized call. As will be described in more detail later, this notification can either be by some interaction with the computer through the user interface, or by picking up the receiver of the telephone. The User1 ITCS client requests the CTServer to establish a PSTN connection from the CTServer to User1's associated phone. This request is accomplished by sending a Receive Notification Request 101 to the CTServer. The CTServer will originate a PSTN Setup ring signal 102 to User1's phone causing the phone to ring. Once the CTServer detects an Answer 103 from the phone, the CTServer sends an Off-hook Notify message 104 back to the associated ITCS client. The client responds with an Offer Call Request message 105 back to the CTServer supplying the Directory Number (DN) of User2.

Upon receiving the Offer Call Request message from the User1 Client, the CTServer will notify the User2 Client associated with the user being called by sending the User2 client a Call Offered Notification message 106. The User2 Client responds to the Call Offered message by sending a Receive Notification Request message 107 back to the CTServer requesting the server to ring the phone associated with the User2 Client. The CTServer originates a Setup ring signal 108 to the User2 phone. Upon receiving an Alerting message 109 back from the phone, the CTServer can notify the User1 Client that the called phone is ringing by sending it a Ring Notification message 110.

When the called user (User2) answers the phone, the CTServer will receive an Answer message 111 and notify the User2 Client by sending the User2 client an Off-Hook Notification message 112. The User2 Client responds to the Off-Hook Notification message by sending an Accept Call Request message 113 back to the CTServer. When the CTServer receives the Accept Call message from the User2 ITCS Client, the CTS notifies the calling user that the voice connection has been accepted by sending the User1 Client a Call Accepted Notification message 114. Now the PSTN voice session is established between the User1 phone and the User2 phone.

The User1 Client now proceeds to automatically establish an H.323 data connection to the User2 Client. First, User1 Client initiates a search request 115 to perform a lightweight directory access protocol (LDAP) lookup. LDAP is a standard used in the internet for directory queries. These directories can be public or private. The query intiated at 115 is performed on a set of network centric directories using the e-mail address of User2 as the distinguished name in the lookup. The LDAP directory server responds to the User1 client with a Search Response message 116 identifying the current data network address of the User2 Client. In the preferred embodiment, the data network employed will be a TCP/IP network and the address will be an IP address. Upon receiving the LDAP Search Response message, the User1 Client sends an H.323 call Setup message 117 directly to the User2 Client requesting to establish an H.323 data call. As soon as the User2 ITCS Client receives the Setup message, it immediately responds with an H.323 Connect message 118 since the User2 user has already indicated a desire to communicate by just having answered the phone. A harmonized call has just been established resulting in a PSTN voice session between both users as well as an associated H.323 compliant data session between the two ITCS clients.

When User1 hangs up the phone, a Release message 119 is sent to the CTServer. The CTServer propagates the Release to the User2 phone as Release message 120 resulting in the complete release of the PSTN voice call. The CTServer then proceeds to notify both the User1 and User2 Clients that the voice session has been released by sending a Release Notification messages 121 and 122. Once the User1 Client receives the Release Notification message 122 from the CTServer, the User1 Client immediately takes down the H.323 call by sending an H.323 Release message 123 to User2.

ITCS User to Non-ITCS User Call Flows

Figure 2:
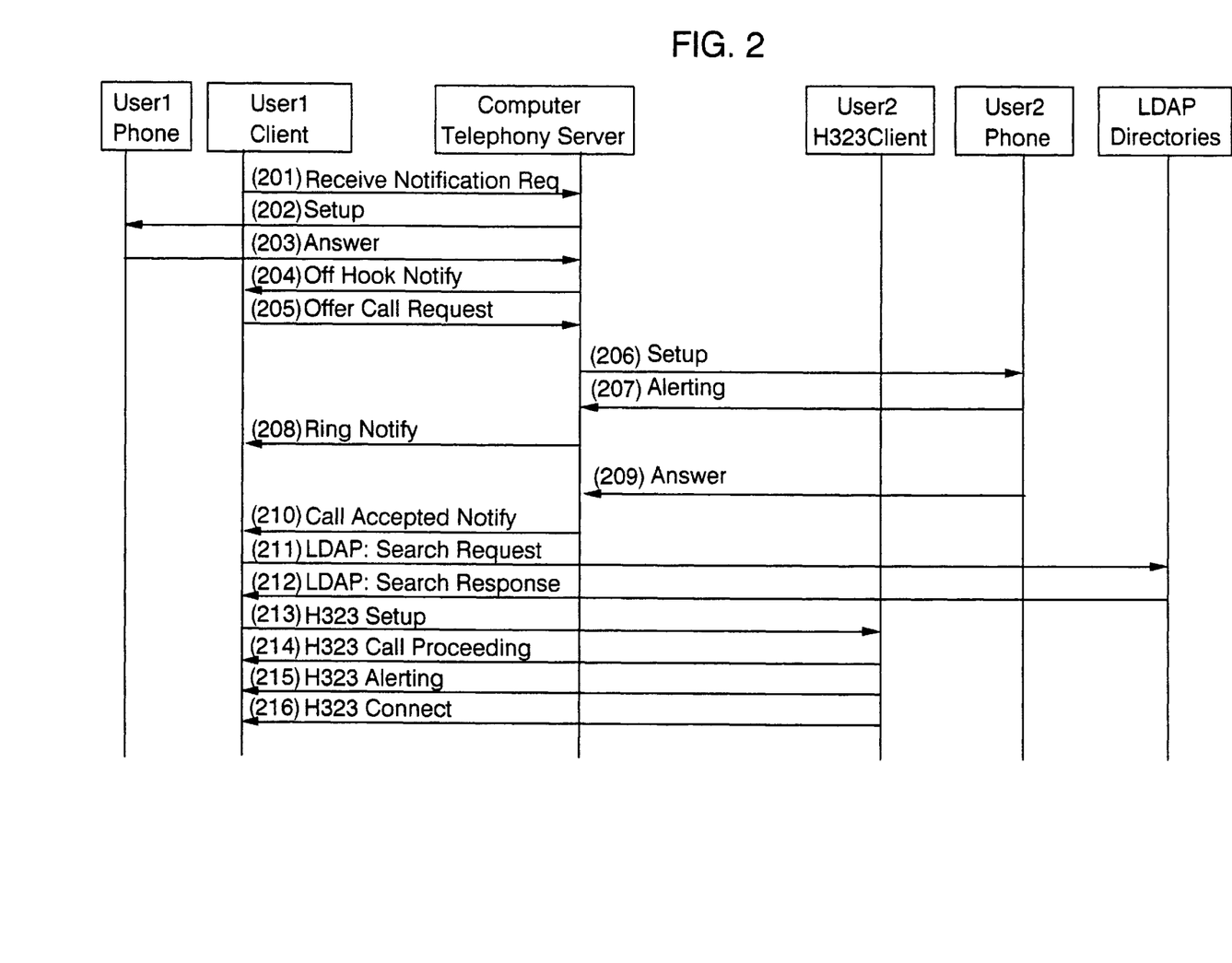
FIG. 2 is a call flow diagram which illustrates how harmonized call is initiated to a called user who is not using the Integrated Telecommunications Collaboration System of the present invention.

FIG. 2 describes the sequence of messages sent between two user's clients and telephones during the establishment and setup of a harmonized call between an ITCS client and a non-ITCS client. The user who does not have an ITCS does have a generic H.323 compliant client running on his/her desktop computer. User1 originates the call in an identical fashion as shown in FIG. 1. Messages 201 through 205 are identical to messages 101 through 105 of FIG. 1.

Upon receiving the Offer Call Request message 205 from the User1 Client, the CTServer sets up a voice connection to the phone associated with User2 via message 206. Upon receiving an Alerting message 207 back from the phone, the CTServer can notify the User1 Client that the called phone is ringing by sending the User1 Client a Ring Notification message 208. When the called user, User2, answers the phone at 209, the CTServer will detect the answer and will notify the calling user that the voice connection has been accepted by sending the User1 Client a Call Accepted Notification message 210. Now the PSTN voice session is established between the User1 phone and the User2 phone.

The User1 ITCS Client now proceeds to automatically establish an H.323 data connection to the User2 H.323 Client. First, the User1 Client performs an LDAP lookup on a set of network centric LDAP directories using the e-mail address of User2 as the distinguished name in the lookup. The User1 Client initiates the search by sending a Search Request message 211. The LDAP directory server responds with a Search Response message 212 identifying the current IP address for the User2 H.323 Client. Upon receiving the LDAP Search Response message, the User1 Client sends an H.323 call Setup message 213 directly to the User2 H.323 Client requesting to establish an H.323 connection. The User2 H.323 Client receives the Setup message, and responds with an H.323 Call Proceeding message 213 followed by an H.323 Alerting message 215. Once the User2 Client accepts the H.323 call, an H.323 Connect message 216 is sent back to the User1 ITCS Client. User1 has completed a harmonized call to a non-ITCS H.323 user resulting in a PSTN voice session between both users as well as an H.323 compliant data session between the User1 ITCS Client and the User2 H.323 client. In the above case, as well as in the ITCS to ITCS call case, the data session is associated with the voice call and closely integrated with the computer desktop applications and the computer user interface.

Description of ITCS Client Software

Figure 3:
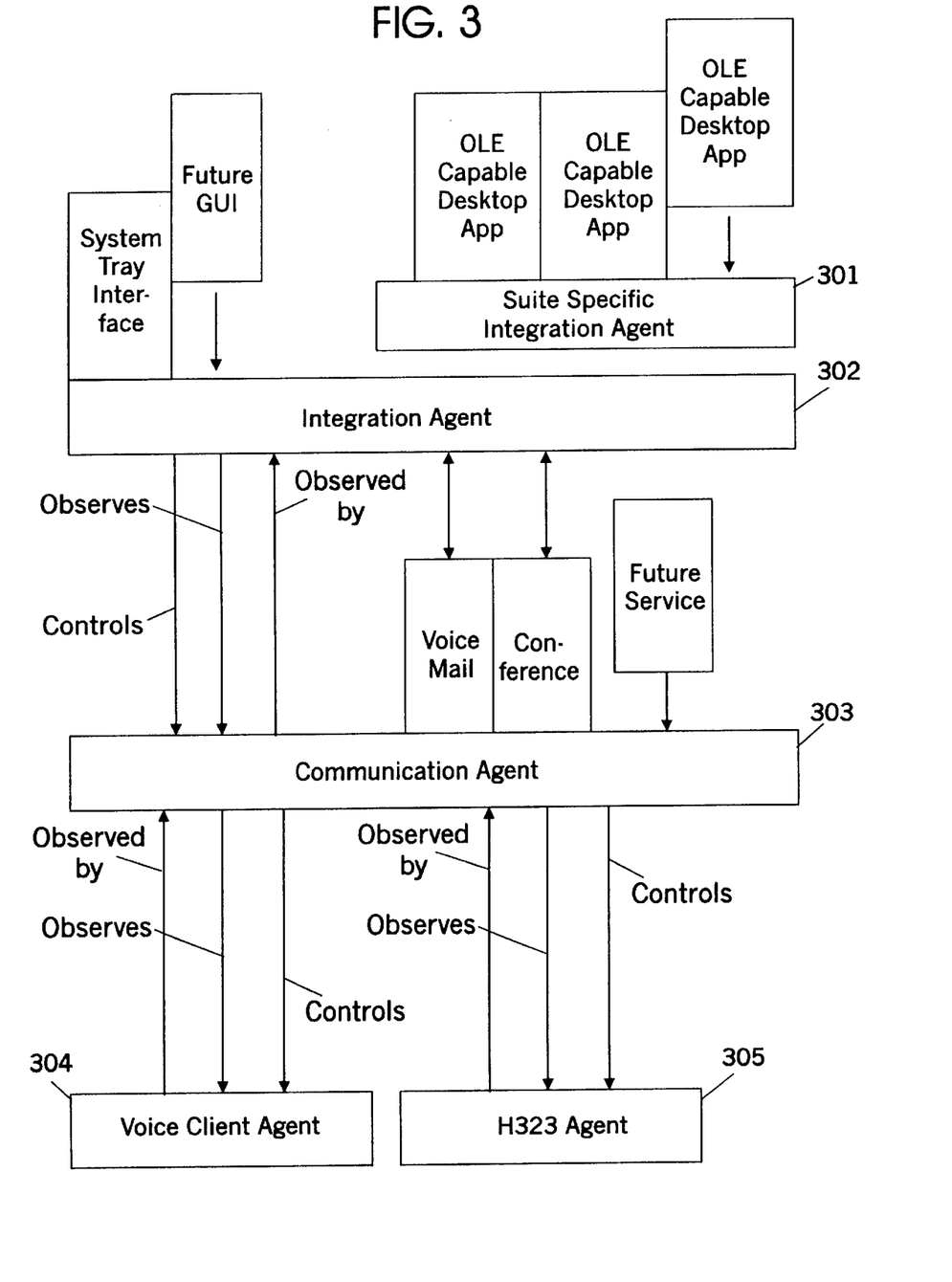
FIG. 3 is a functional block diagram showing the interconnection of the various software components of the Integrated Telecommunication Collaboration System of the present invention.

The Integrated Telecommunication Collaboration System client software architecture includes four main components, plus services and sub-components, which vary depending on the operating environment for which the particular client is intended. FIG. 3 shows a component diagram. Data Agent 305 is responsible for establishing a data call to another client as requested by the Communication Agent 303. Data Agent 303 is also responsible for interacting with directory services to perform address translation such as the e-mail to IP address translation which may be required as part of the call connection message flow previously discussed. In the preferred embodiment H.323 is used as the data agent, but any type of data agent can be used. Voice Client Agent 304 is responsible for communicating directly with the computer telephony server to perform the telephony functions. In effect, the data agent handles the data call aspects of the ITCS and the voice agent handles the PSTN voice call aspects.

Communication Agent 303 is responsible for synchronizing the Data Agent and the Voice Client Agent. In the preferred embodiment, Communication Agent 303 makes available an object linking and embedding (OLE) compliant interface allowing other applications to make communication requests such as place a call, release a call, share an application, collaborate on an application, etc. The Communication Agent 303 interfaces and registers with the Data Agent 305 and the Voice Client Agent 304 and monitors them for events.

Integration Agent 302 is the component responsible for integrating the ITCS communication capability directly into a specific set of computer desktop applications as well as integrating the ITCS directly into an operating system interface. How the capabilities are integrated into the operating system interface depends on what operating system the ITCS is designed to work with. If the ITCS client software is designed for use with a recent version of the Windows™ operating system from Microsoft Corporation such as Windows 95™, the ITCS can interface to the system application tray. Integration Agent 302 processes user input and makes the appropriate communication requests of the Communication Agent 303.

Additional communication services such as conferencing and voice mail can be plugged into the Communication Agent to observe communication events occurring within the Communication Agent, make communication requests of the Communication Agent, and present additional graphical user interface extensions to the Integration Agent. In most cases, a Suite Specific Integration Agent, which serves as a subagent to the Integration Agent, will be required to provide direct interface into desktop applications. The Suite Specific Integration Agent is shown in FIG. 3 for completeness.

Figure 4:
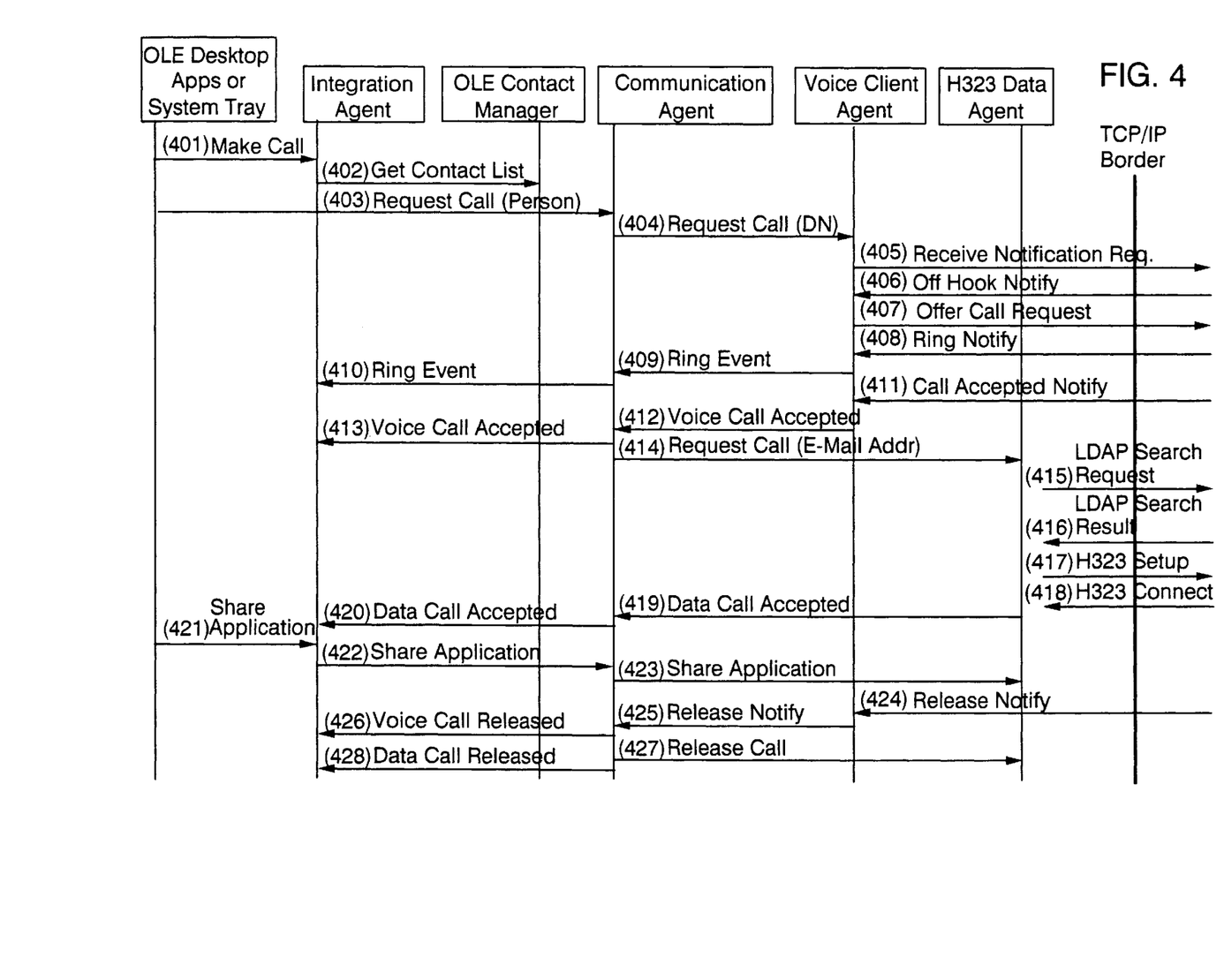
FIG. 4 is a message flow diagram which illustrates the communication between the various components of the software client of the present invention when a call is initiated from a computer desktop.
Figure 5:
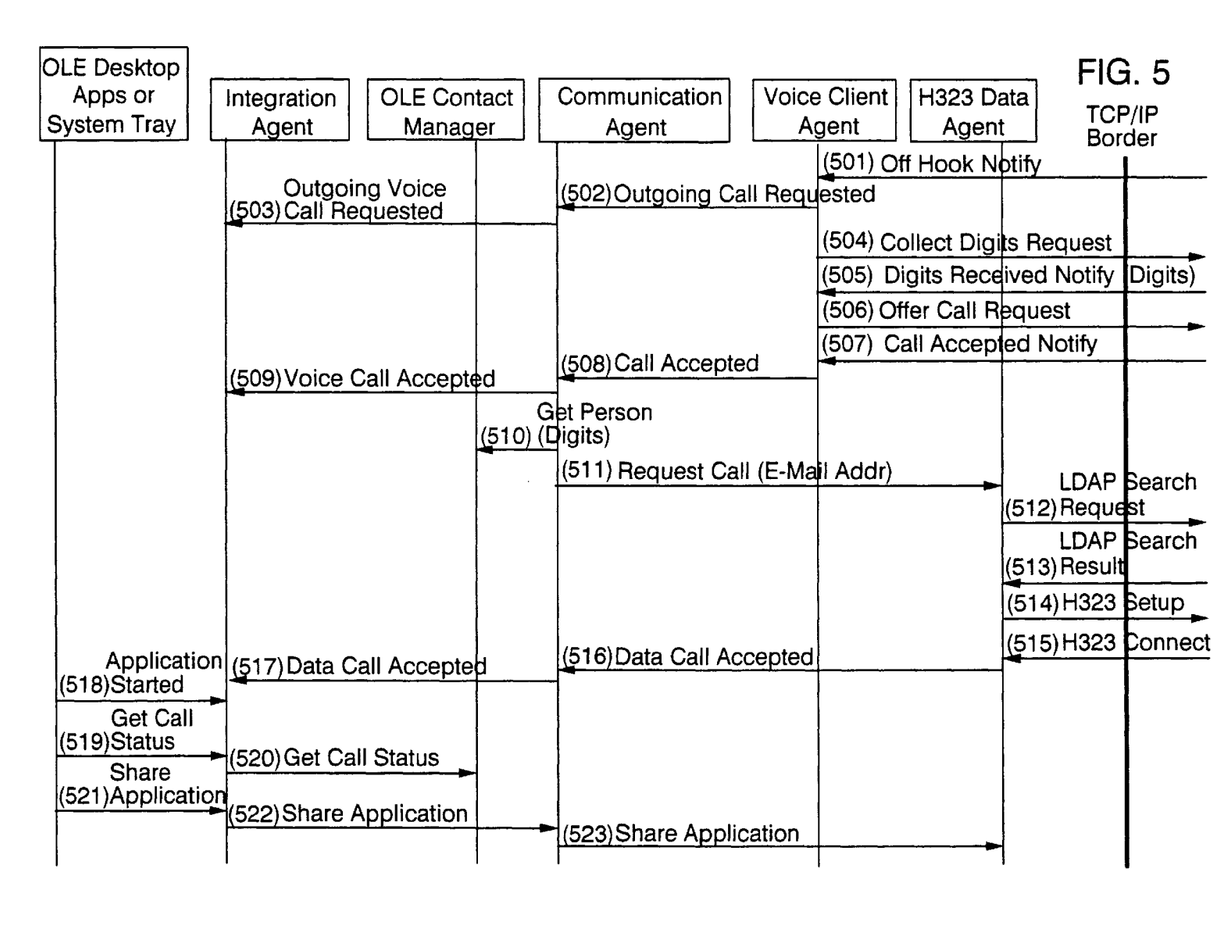
FIG. 5 is a message flow diagram which illustrates the communication between the various components of the software client of the present invention when a call is initiated by lifting a telephone receiver.
Figure 6:
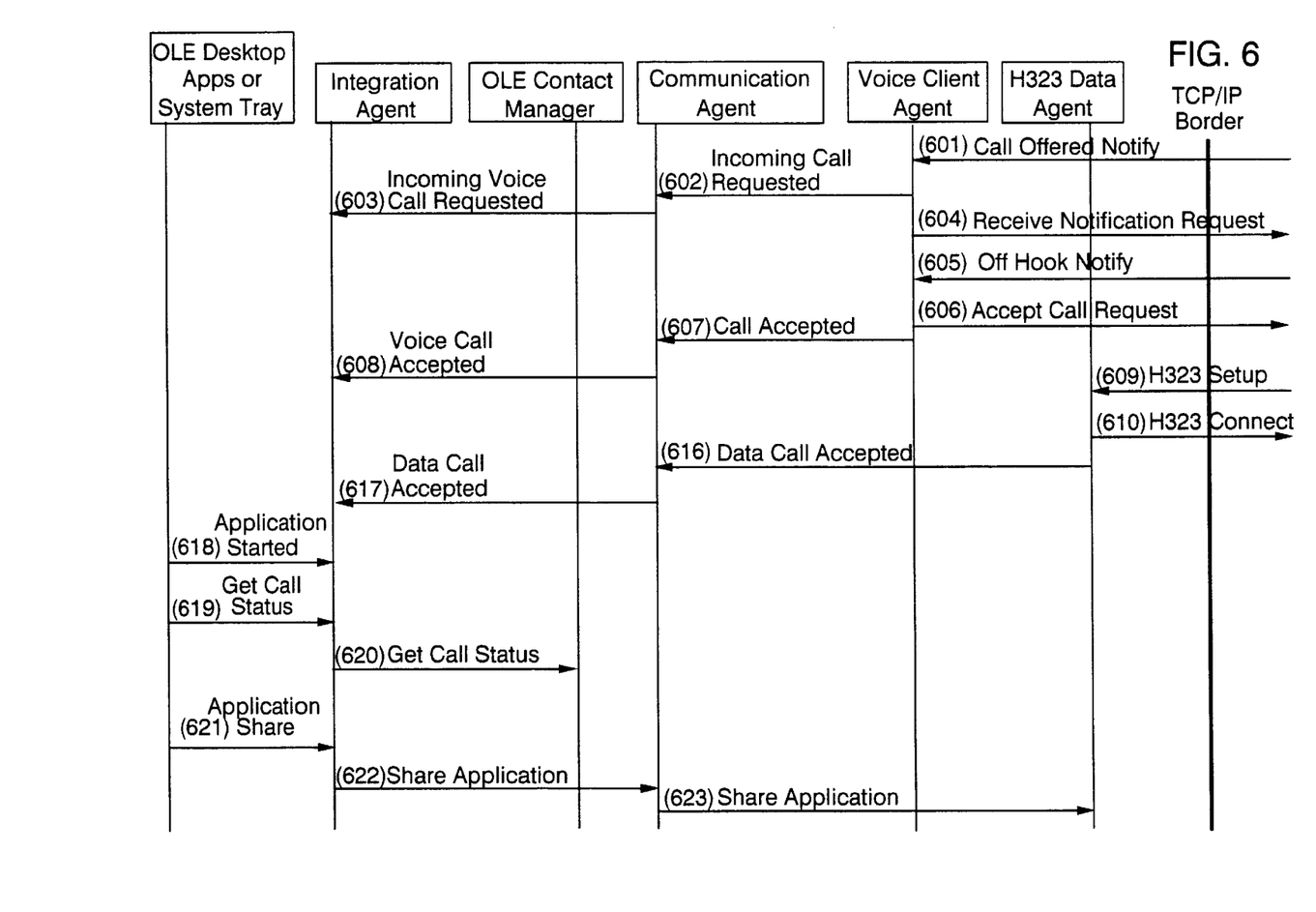
FIG. 6 is a message flow diagram which illustrates the communication between the various components of the software client of the present invention when a harmonized call is received.

Each component shown in FIG. 3 can act as an observer and can monitor other component's events. Likewise, each component may be observed by other components. Each component in the architecture observes the event space of the component directly underneath it while at the same time being observed by those components above it. To further illustrate the detailed relationships between the various components of the client software, FIGS. 4, 5, and 6 show examples of the detailed messages being passed between the various components. In these examples, it is assumed that the data agent is an H.323 compliant data agent and that data communications take place over a TCP/IP network such as the Internet, although the invention can be used with any data communication platform and with any type of data network.

FIG. 4 describes the interaction between the client components as a user requests a call and sharing of applications, where the user initiates the request through interacting with the computer. The application is already running. Once a request to make a call 401 is received via the user interface, the Integration Agent interacts with a Contact Manager to obtain a list of contacts at 402. The list is used to select the contact which the user wants to establish a call with.

After the contact information is entered, the Integration Agent requests the Communication Agent to make a call to the selected person at 403. The Communication Agent obtains the Directory Number (DN) information from the contact information and requests the Voice Client Agent to make a PSTN connection with the specified DN at 404. The Voice Client Agent interacts with the CTServer to initiate the PSTN connection as specified in the previous call flows, as shown at 405, 406, and 407.

When the CTServer has routed the call to the selected called user and detects that the called user's phone is ringing, then the Voice Client Agent will receive a Ring Notify message 408 which is observed by the Communication Agent at 409 and then by the Integration Agent at 410. In the preferred embodiment, the Integration Agent updates the appropriate on-screen information to notify the user that the phone is ringing.

Eventually the called user will answer the phone. The CTServer detects the answer and notifies the Voice Client Agent by sending it a Call Accepted Notify message 411. The Voice Client Agent posts a Voice Call Accepted event 412 to the Communication Agent where it is observed by the integration Agent at 413. The Integration Agent updates the appropriate on screen information to notify the user that the other user has answered the call. The Communication Agent then proceeds to request the H.323 Data Agent at 414 to make an H.323 data connection to the client specified by the e-mail address which was obtained from the contact information.

The H.323 Data Agent obtains the IP Address from an LDAP directory lookup at 415 and 416 and proceeds to setup an H.323 call at 417 and 418 to the H.323 client specified at the IP address. Once the H.323 data call is answered, an H.323 Connect message 418 is received by the Data Agent. A Data Call Accepted event 419 is posted on the Communication Agent where the Integration agent observes it updates on-screen information accordingly at 419 and 420. Now the User is aware that a data session is also active and that application sharing may now commence.

At 421 the user requests that an application be shared. A Share Application message 422 is sent by the Integration agent to the Communication Agent. This message is replicated and sent as another Share Application message 423 from the Communication Agent to the H.323 Data Agent.

The harmonized call is terminated if and when the Voice Client Agent receives a Release Notify message 424. This message is replicated and forwarded to the Communication Agent as another Release Notify message 425. The Communication Agent then releases the voice call and sends a Voice Call Released message 426 to the Integration Agent, sends a Release Call message 427 to the H.323 Data Agent and notifies the Integration Agent that the data call has been released by sending a Data Call Released Message 426.

FIG. 5 describes the interaction between the client components as a user requests a call, where the user initiates the request by picking up the telephone. The CT Server is made aware of the fact that the user has lifted the handset by one of three methods: 1) by being the same server to service all telephony requests from that user, for example, because it is a central office switch or a PBX; 2) by being notified by an AIN or signaling system 7 (SS7) network; or 3) by having the user dial directly into the CTServer. The CTServer will respond with an Off-Hook Notify message 501 to the Voice Client Agent within the Client. The Voice Client Agent raises an Outgoing Call Requested event 502 to the Communication Agent and the event is observed by the Integration Agent at 503. The Voice Client Agent requests the CTServer to apply dial tone to the phone and collect digits by sending the CTServer a Collect Digits Message 504. The CTServer applies dial tone to the PSTN phone and collects the digits entered by the user. Once the digits have been collected by the CTServer, the server sends a Digits Received Notify message 505 to the Voice Client Agent notifying the Voice Client that digit collection has completed and what the digits are. The Voice Client Agent responds to the digit collection by sending an Offer Call Request message 506 to the CTServer requesting that the server offer a call to the user whose DN is specified by the digits.

The CTServer originates the call to the called user and notifies the Voice Client Agent when the called user answers at 507. The Communication Agent observes the Call Accepted event 508 and translates it to a Voice Call Accepted event 509 which is observed by the Integration Agent. The Integration Agent updates the appropriate on-screen information. The Communication Agent interacts with the Contact Manager at 510 to obtain the contact information for the person whose DN matches the DN which was entered via digit collection. Once the contact information is retrieved from the Contact Manager, the Communication Agent requests the H.323 Data Agent to make an H.323 connection to the e-mail address which was contained within the contact information sent at 511.

The Data Agent establishes the H.323 data connection as specified in the earlier section through messages 512, 513 and 514. Once the H.323 connect message 515 is received, the Data Agent sends a Call accepted event 516 to the Communication Agent which, in turn, notifies the Integration Agent that the Data Call has been accepted at 517. The user then starts an application which has been integrated with the ITCS at 518. At 519 and 520, a GetCallStatus message is exchanged to determine if a user is already involved in a call. This message is exchanged when a new application which has been integrated with the ITCS is started. It was not exchanged in the process illustrated in FIG. 4 because it was assumed the application was already running. The rest of the process involves application sharing and is identical to that described in FIG. 4 and it's accompanying description. Messages 521, 522, and 523 correspond to messages 421, 422 and 423 in FIG. 4. The call release process is not shown in FIG. 5 for the sake of simplicity.

FIG. 6 shows the interactions between the Harmony client components as the ITCS processes incoming calls. The CTServer notifies the Voice Client Agent that a call is being offered by sending a Call Offered message 601. The Voice Client Agent notifies the Communication Agent a 602 which then notifies the Integration Agent that a Voice Call has been offered at 603. The Integration Agent displays appropriate caller id information based on information received from the Contact Manager.

The Voice Client Agent sends a Receive Notification message 604 to the CTServer requesting that it ring the ITCS user's phone. Once the user picks up the handset, the CTServer detects it and sends an Off-Hook Notification message 605 to the Voice Client Agent notifying the Voice Client Agent that the user has just picked up the phone handset. The Voice Client Agent sends an Accept Call Request message 606 to the CTServer asking that the CTServer connect the user's phone to the incoming call. The Voice Client Agent then notifies the Communication Agent that the voice connection has been accepted at 607. The Communication Agent notifies the Integration Agent that the incoming voice call has been accepted at 608 so that the appropriate screen information can be updated.

Shortly following the acceptance of the voice call, the H.323 Data Agent receives an H.323 Call Setup message 609 requesting the establishment of a data session. The H.323 Data Agent responds with the appropriate handshaking. This handshaking is specified in the ITU H.323 specification. The Data Agent eventually accepts the call by sending an H.323 Connect message 610. The Data Agent notifies the Communication Agent that the data connection has been accepted at 611. The Integration Agent is then informed that the data call has been accepted. Application sharing can begin at that point. The same messages are exchanged as before, messages 618 through 623 corresponding to messages 518 through 523 in FIG. 5. Again, the call release process is not shown in FIG. 6 for the sake of simplicity.

Description of ITCS Operating Environment

Figure 7:
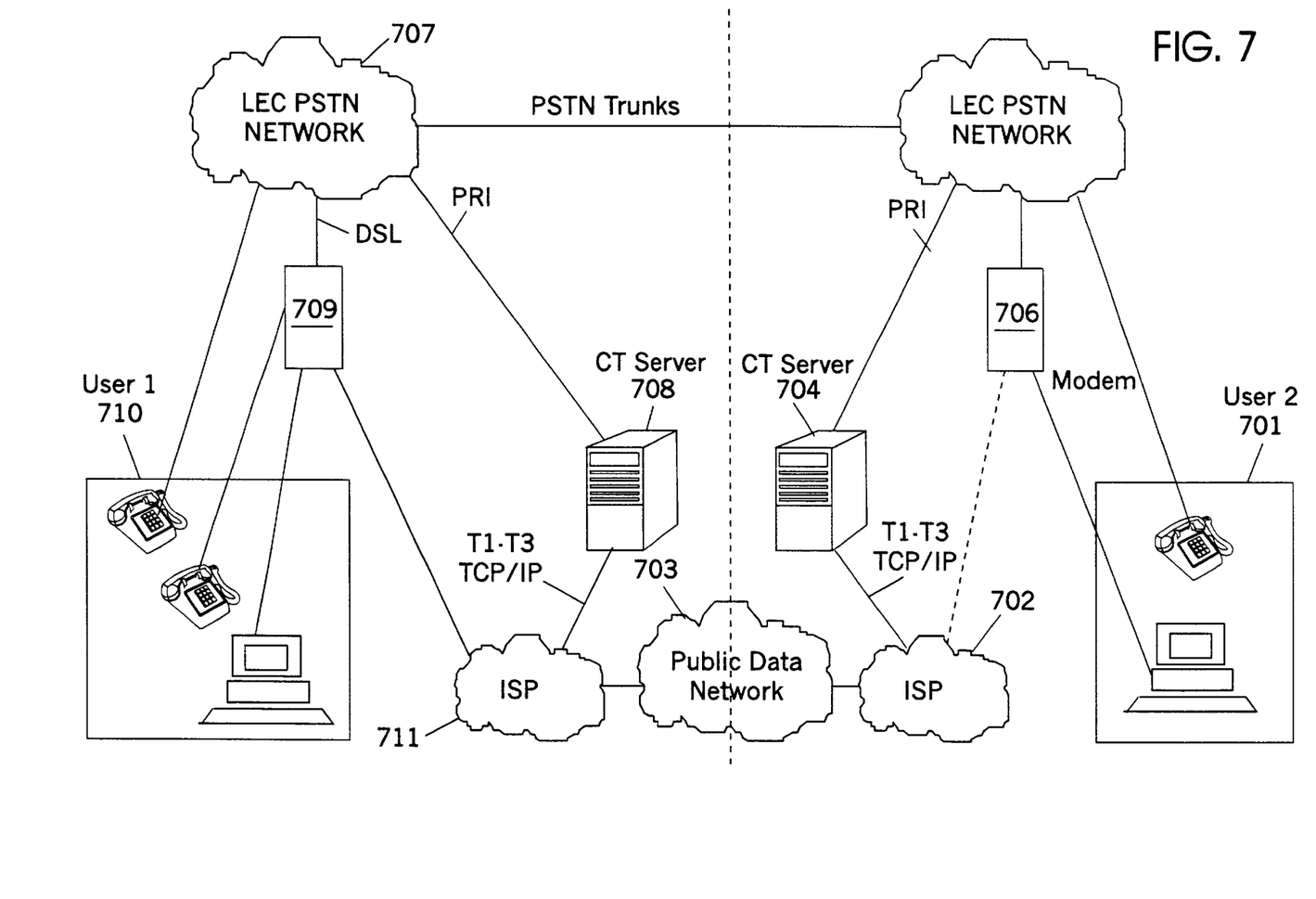
FIG. 7 shows the network environment in which the present invention is used.

FIG. 7 illustrates two of many possible network environments in which the present invention may be used. On the right side of FIG. 7, is shown User2, 701, whose telephone is interfaced directly to a public switched telephone network (PSTN) 705. Additionally User2 has a personal computer workstation which is interfaced to both the PSTN and a point-of-presence 702 for an Internet service provider (ISP) via a conventional modem 706. The computer telephony server (CTServer) 704 is connected between the PSTN an the ISP point-of-presence. In the preferred embodiment the server is connected to the PSTN via a primary rate interface (PRI), which is a well-known part of the integrated services digital network (ISDN) standard. The connection to be ISP point-of-presence is made via either a T1, T3, or TCP/IP interface. The desktop computer at the User2 location is running the ITCS client software as previously discussed.

The left side of FIG. 7 is similar to the right side. However, User1, 710 shown on the left side of FIG. 7 is using a digital subscriber loop (DSL) to interface the desktop computer to the PSTN and the ISP. The digital subscriber loop can also be used to interfaced telephones into the networks. DSL modem 709 provides the interface point for both the desktop computer and a DSL telephone. In addition User1 710 has available a conventional telephone that directly interfaces to PSTN 707. CTServer 708 works essentially the same as CTServer 704. According to FIG. 7, User1 is served by one local exchange carrier (LEC), and User2 is served by a different LEC. The two PSTN's are connected via PSTN trunks. Additionally, the two Internet service providers 702 and 711 are connected via the public data network 703. In the preferred embodiment the public data network is the Internet.

It should be noted that although FIG. 7 shows one example a network environment in which the invention can operate, there are many other alternatives. Indeed the public networks could be replaced by privately owned networks. Is also possible to interface the CTServer to the ITCS via completely different paths depending on what types of networks are available and what type of interface the CTServer implements. The client software which implements the invention can operate with standard CTServer interfaces including the telephony application programming interfaces published by Microsoft and Novell. However, one of ordinary skill in the art can develop a custom or proprietary interface for the CTServer which would work with the present invention.

Figure 8:
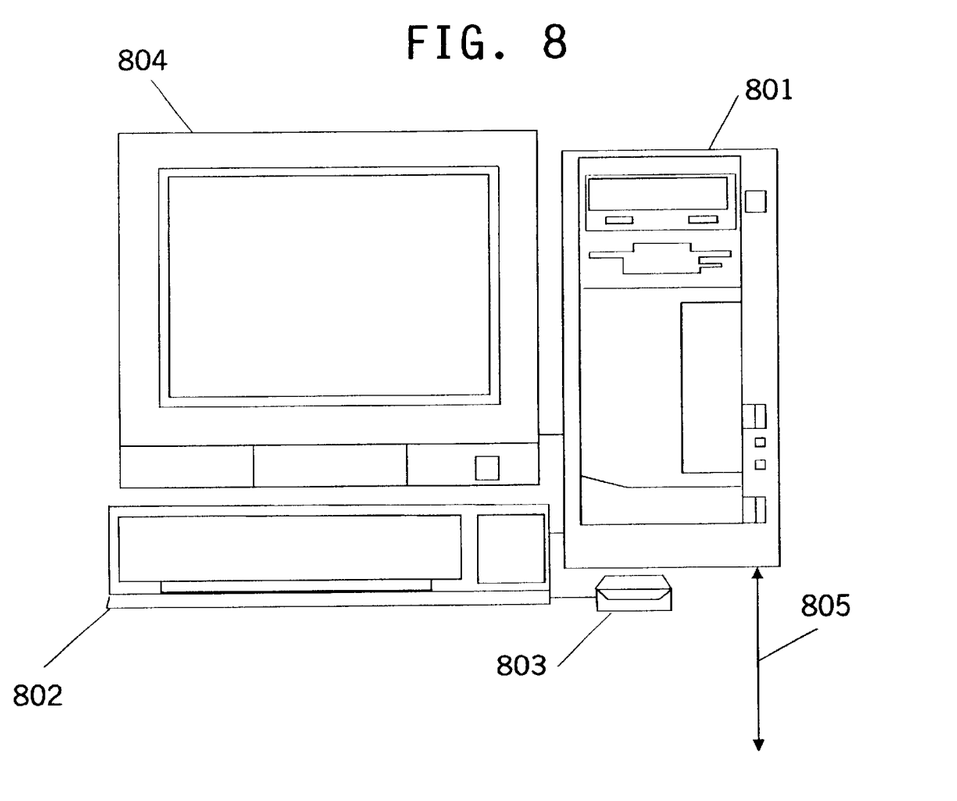
FIG. 8 illustrates a client workstation implementing the present invention.

FIG. 8 illustrates a personal computer workstation on which the client software of the present invention can be operated. Input output (I/O) devices such as keyboard 802, mouse 803, and display 804. The display is used to show an operator a computer desktop on which various information is displayed. Such information may include information about the status of harmonized calls made with the present invention. System unit 801 is connected to all of the I/O devices, and contains memory, media devices, and a central processing unit (CPU) all of which together execute the client software of the present invention and cause the various agents and software elements of the present invention to operate when the invention is in use. A network interface is normally implemented via an adapter card however for the sake of simplicity the shown graphically as interface 805.

Figure 9:
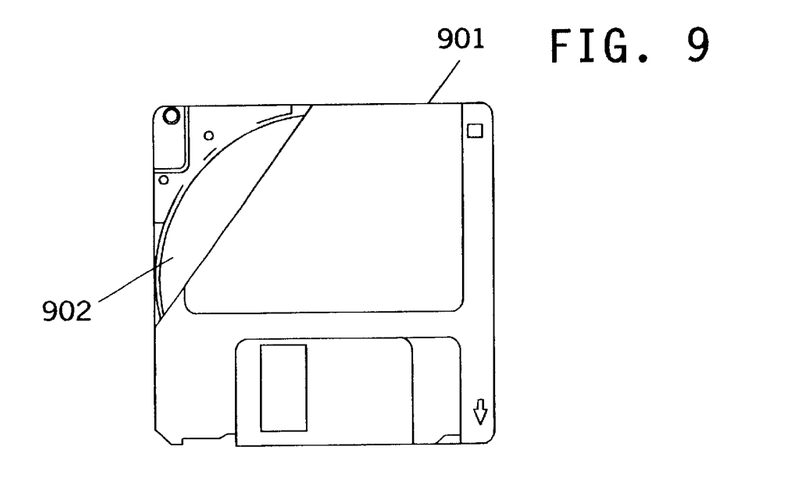
FIG. 9 shows one example of a medium on which a computer program which implements the present invention may be stored.

As previously mentioned, appropriate computer program code in combination with appropriate hardware implements most of the elements of the present invention. This computer program code is often stored on storage media. This media can be a diskette, hard disk, CD-ROM, or tape. The media can also be a memory storage device or collection of memory storage devices such as read-only memory (ROM) or random access memory (RAM). Additionally, the computer code can be transferred to the workstation over the Internet or some other type of network. FIG. 9 illustrates one example of a media. FIG. 9 shows a diskette of the type where magnetic media 902 is enclosed in a protective jacket 901. Magnetic field changes over the surface of the magnetic media 902 are used to encode the computer program code. In this way the computer program code is stored for later retrieval.

We have described specific embodiments of our invention which provides a way in which applications, data communications, and public switched telephone network voice calls can be integrated together by a desktop computer. One of ordinary skill in the networking and computing arts will quickly recognize that the invention has other applications in other environments. In fact, many embodiments and implementations are possible. The following claims are in no way intended to limit the scope of the invention to the specific embodiments described.

We claim:

1. A method of establishing a harmonized call, the method comprising the steps of:

upon receiving a calling user request via a computer system user interface, requesting a server to establish a public switched telephone network (PSTN) connection between the server and a calling user;

receiving a notification that PSTN connection between the server and the calling user has been established;

requesting the server to offer the harmonized call to a called user;

receiving a notification the harmonized call has been accepted by the called user; and establishing a PSTN session and an associated data session with the called user.

2. The method of claim 1 further comprising the step of receiving a ring notification message while the harmonized call is being offered to the called user.

3. The method of claim 1 further comprising the steps of:

receiving a release notification message; and releasing the PSTN session and the associated data session with the called user.

4. The method of claim 2 further comprising the steps of:

receiving a release notification message; and releasing the PSTN session and the associated data session with the called user.

5. The method according to any of claims 1 through 4 wherein the associated data session includes application sharing.

6. A method of establishing a harmonized call, the method comprising the steps of:

upon receiving an off-hook notification message, requesting a server to establish a public switched telephone network (PSTN) connection between the server and a calling user;

receiving a notification that the PSTN connection between the server and the calling user has been established;

requesting the server to offer the harmonized call to a called user;

receiving a notification the harmonized call has been accepted by the called user; and establishing a PSTN session and an associated data session with the called user.

7. The method of claim 6 further comprising the step of receiving a ring notification message while the harmonized call is being offered to the called user.

8. The method of claim 6 further comprising the steps of:

receiving a release notification message; and releasing the PSTN session and the associated data session with the called user.

9. The method of claim 7 further comprising the steps of:

receiving a release notification message; and releasing the PSTN session and the associated data session with the called user.

10. The method according to any of claims 6 through 9 wherein the associated data session includes application sharing.

11. A method of receiving a harmonized call, the method comprising the steps of:

receiving a call offered notification message from a server;

requesting the server to establish a public switched telephone network (PSTN) connection between the server and a called user;

receiving a notification that the PSTN connection between the server and the called user has been established; and establishing a PSTN session and an associated data session with a calling user integrated telecommunication collaboration system.

12. The method of claim 11 wherein the associated data session includes application sharing.

13. A computer program product for establishing a harmonized call, the computer program product having a medium with a computer program embodied thereon, the computer program comprising:

computer program code for receiving a calling user request via a computer system user interface and requesting a server to establish a public switched telephone network (PSTN) connection between the server and a calling user;

computer program code for receiving a notification that the PSTN connection between the server and the calling user has been established;

computer program code for requesting the server to offer the harmonized call to a called user;

computer program code for receiving a notification the harmonized call has been accepted by the called user; and computer program code for establishing a PSTN session and an associated data session with the called user.

14. The computer program product of claim 13 wherein the computer program further comprises computer program code for receiving a ring notification message while the harmonized call is being offered to the called user.

15. The computer program product of claim 13 wherein the computer program further comprises:

computer program code for receiving a release notification message; and computer program code for releasing the PSTN session and the associated data session with the called user.

16. The computer program product of claim 14 wherein the computer program further comprises:

computer program code for receiving a release notification message; and computer program code for releasing the PSTN session and the associated data session with the called user.

17. The computer program product according to any of claims 13 through 16 wherein the associated data session includes application sharing.

18. A computer program product for establishing a harmonized call, the computer program product having a medium with a computer program embodied thereon, the computer program comprising:

computer program code for receiving an off-hook notification message and requesting a server to establish a public switched telephone network (PSTN) connection between the server and a calling user;

computer program code for receiving a notification that the PSTN connection between the server and the calling user has been established;

computer program code for requesting the server to offer the harmonized call to a called user;

computer program code for receiving a notification the harmonized call has been accepted by the called user; and computer program code for establishing a PSTN session and an associated data session with the called user.

19. The computer program product of claim 18 wherein the computer program further comprises computer program code for receiving a ring notification message while the harmonized call is being offered to the called user.

20. The computer program product of claim 18 wherein the computer program further comprises:

computer program code for receiving a release notification message; and computer program code for releasing the PSTN session and the associated data session with the called user.

21. The computer program product of claim 19 wherein the computer program further comprises:
   computer program code for receiving a release notification message; and
   computer program code for releasing the PSTN session and the associated data session with the called user.

22. The computer program product according to any of claims 18 through 21 wherein the associated data session includes application sharing.

23. A computer program product for receiving a harmonized call, the computer program product having a medium with a computer program embodied thereon, the computer program comprising:
   computer program code for receiving a call offered notification message from a server;
   computer program code for requesting the server to establish a public switched telephone network (PSTN) connection between the server and a called user;
   computer program code for receiving a notification that the PSTN connection between the server and the called user has been established; and
   computer program code for establishing a PSTN session and an associated data session.

24. The computer program product of claim 23 wherein the associated data session includes application sharing.

25. An integrated telecommunication collaboration system client comprising:
   a voice agent for establishing public switched telephone network sessions through a server;
   a data agent for establishing associated data sessions with other clients;
   a communications agent connected to the voice agent and the data agent for synchronizing and observing the voice agent and the data agent, the communications agent having interfaces for a plurality of service agents; and
   an integration agent connected to the communications agent for processing user input, making requests of the communications agent, the integration agent having interfaces for a plurality of applications.

26. A computer program product for causing a computer to implement an integrated telecommunication collaboration system client, the computer program product including a medium with a computer program embodied thereon, the computer program comprising:
   computer program code for establishing a voice agent for establishing public switched telephone network sessions through a server;
   computer program code for establishing a data agent for establishing associated data sessions with other clients;
   computer program code for establishing a communications agent connected to the voice agent and the data agent for synchronizing and observing the voice agent and the data agent, the communications agent having interfaces for a plurality of service agents; and
   computer program code for establishing an integration agent connected to the communications agent for processing user input, making requests of the communications agent, the integration agent having interfaces for a plurality of applications.

27. A computer system including an integrated telecommunication collaboration client, the computer system comprising:
   a plurality of input/output devices;
   a network connection;
   a system unit disposed between the plurality of input/output devices and the network connection, the system unit including:
      a voice agent for establishing public switched telephone network sessions through a server;
      a data agent for establishing associated data sessions with other clients;
      a communications agent connected to the voice agent and the data agent for synchronizing and observing the voice agent and the data agent, the communications agent having interfaces for a plurality of service agents; and
      an integration agent connected to the communications agent for processing user input, making requests of the communications agent, the integration agent having interfaces for a plurality of applications.

28. An integrated telecommunication collaboration system client comprising:
   means for establishing a public switched telephone network (PSTN) session through a server;
   means for establishing a data session with another client, wherein the data session is associated with the PSTN session;
   communications means connected to the telephone connection means and the multimedia data connection means for synchronizing and observing the PSTN connection means and the multimedia data connection means, the communications means having interfaces for a plurality of service agents; and
   integration means connected to the communications means for processing user input, making requests of the communications means, the integration means having interfaces for a plurality of applications.

29. An integrated telecommunication collaboration network comprising:
   a public switched telephone network (PSTN);
   a public data network having a service provider point-of-presence for providing connectivity to the public data network;
   a computer telephony server disposed between the PSTN and the public data network;
   a user telephone connected to the PSTN; and
   an integrated telecommunication collaboration system connected to the PSTN and the public data network, the integrated telecommunication collaboration system including a communications agent for synchronizing and observing a voice agent and a data agent, the communications agent having interfaces for a plurality of service agents, the system also including an integration agent connected to the communications agent for processing user input, making requests of the communications agent, the integration agent having interfaces for a plurality of applications.

\* \* \* \* \*